Feb. 7, 1967    G. GOLDEN ET AL    3,302,483
BICYCLE PEDAL CONSTRUCTION
Filed Nov. 24, 1964
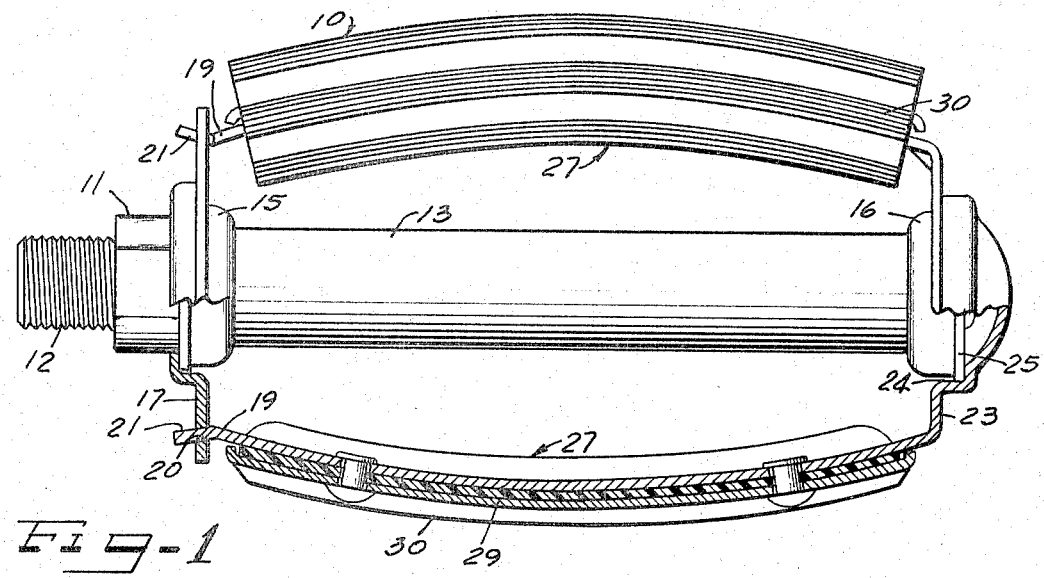
Fig-1
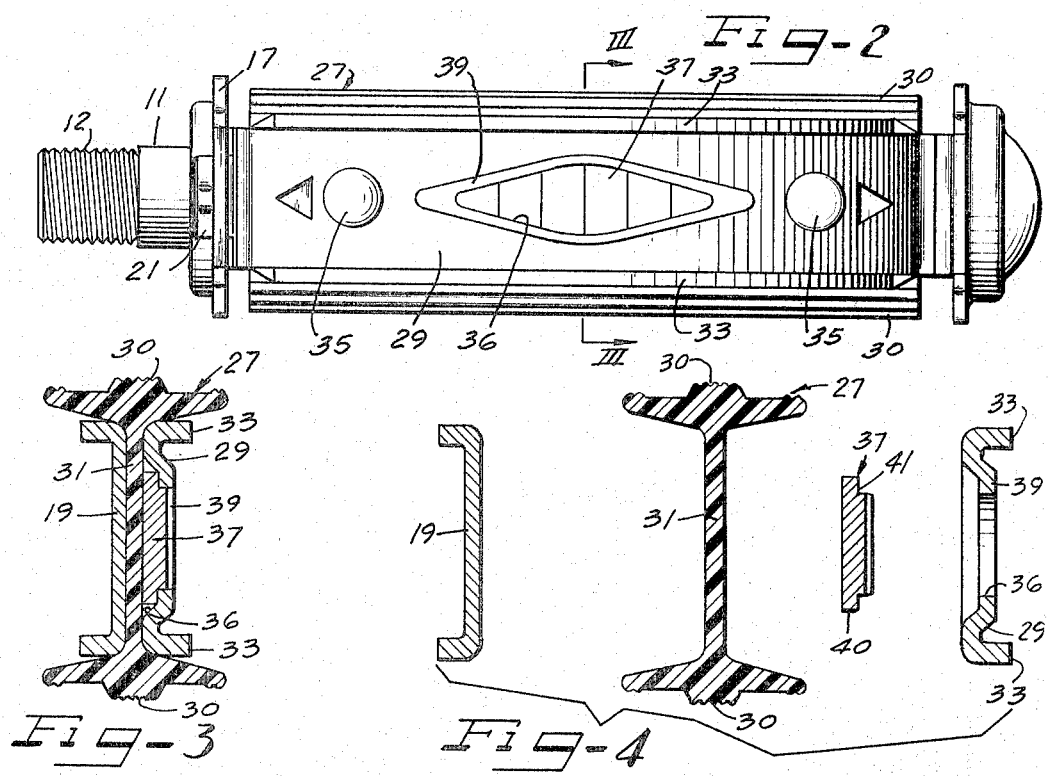
Fig-2
Fig-3
Fig-4
INVENTORS
GERALD GOLDEN
CHARLES V. WROBEL JR.
BY Hill, Sherman, Meroni, Gross & Simpson ATTORNEYS

United States Patent Office 3,302,483
Patented Feb. 7, 1967

3,302,483
BICYCLE PEDAL CONSTRUCTION
Gerald Golden, Highland Park, and Charles V. Wrobel, Jr., Arlington Heights, Ill., assignors to Excel Incorporated, Franklin Park, Ill., a corporation of Illinois
Filed Nov. 24, 1964, Ser. No. 413,427
3 Claims. (Cl. 74—594.4)

This invention relates to improvements in bicycle pedals.

An object of the present invention is to improve upon the bicycle pedals heretofore in use by simplifying the tread structure of the pedal and providing a positive form of clamping means for clamping the tread structure to its support.

A further object of the invention is to provide an improved form of pedal construction particularly adapting the pedal for plastic pedal treads, having a simple means for clamping the treads to their supports.

Still another object of the invention is to provide an improved form of bicycle pedal construction in which clamping plates are utilized to clamp the pedal treads to their supports and to retain emblems to the pedal.

Still another object of the invention is to provide a new and improved bicycle pedal in which the pedal treads are generally I-shaped in cross section and are clamped to their supports and in which the means for clamping the pedal treads to their supports also forms a means for clamping reflectors to the pedal.

A still further object of the invention is to provide an improved means for mounting reflectors on bicycle pedals in which the pedal treads are clamped to their supports by clamping plates, and the clamping plates have reflective emblem receiving recesses therein having outwardly raised flanged margins extending about the recesses and clamping the emblems to the pedal between the treads thereof.

These and other objects of the invention will appear from time to time as the following specification proceeds and with reference to the accompanying drawing wherein:

FIGURE 1 is a plan view of a bicycle pedal constructed in accordance with the principles of the present invention, with one of the pedal treads its support and clamping means shown in horizontal section and with certain other parts broken away and shown in section;

FIGURE 2 is a view in side elevation of the pedal shown in FIGURE 1;

FIGURE 3 is a fragmentary sectional view taken through a pedal tread support and clamping plate, substantially along line III—III of FIGURE 2;

FIGURE 4 is an exploded view of the pedal tread support, tread emblem and clamping plate shown in vertical section.

In the embodiment of the invention illustrated in the drawings, we have shown a pedal 10 journalled on a pedal shaft 11 on ball bearings (not shown) in a conventional manner and no part of the present invention so need not be herein shown or described. The pedal shaft 11 has a threaded inner end portion 12 adapted to be threaded on a crank arm of a bicycle sprocket (not shown), for rotatably driving the sprocket.

The pedal 10 also includes a hub 13 having enlarged diameter end portions 15 and 16, raised with respect to an intermediate portion of said hub to form internal bearing races (not shown) for the ball bearings journalling the hub on the pedal shaft (not shown). A cross bar 17 extends about the shaft 11 and abuts the inner end of the raised portion 15 of the hub 13 and is retained in abutting engagement therewith by pedal supports 19 extending through elongated slots 20 in opposite sides of the cross bar 17 and crimped thereto as by crimping indicated generally by reference characters 21, 21 in FIGURES 1 and 2.

The pedal supports 19, 19 are shown as being formed integrally with an outer cross bar 23 at the opposite end of the hub 13 from the cross bar 17. The cross bar 23 has an inwardly dished portion 24 engaging a flanged end portion 25 of the raised end portion 16 of the hub 13, and maintained in firm engagement with said flanged end portion by the crimping 21.

The pedal supports 19 are bent inwardly with respect to the outer cross bar 23 and are shown in FIGURES 3 and 4 of being channel-like in cross section, intermediate the ends thereof, to rigidify the pedal structure.

Pedal treads 27 are clamped to the outer sides of the pedal supports 19 by clamping plates 29 as will hereinafter more clearly appear as this specification proceeds. The pedal treads 27 are preferably made from a plastic material, which may be a nylon plastic material or any other suitable plastic, and may even be made from rubber or from one of the well known substitutes for rubber. Each pedal tread 27 is shown as being generally I-shaped in cross section having opposite flanges 30, 30 connected together by a web 31. The flanges 30 may have ribs extending therealong, raised to provide a gripping means for the foot of the cyclist and may be of various forms which will give a good gripping surface.

The space between the flanges 30 along the web 31 is substantially equal to the height of the tread support 19, to fit along said tread support and accommodate clamping of said pedal tread to said tread support by a clamping plate 29. The clamping plate 29 is shown in FIGURES 3 and 4 as being generally channel-like in cross section having outwardly extending flanges 33, and is of substantially the height of the pedal support 19 to fit along the web 31 for the height thereof, with the flanges 33, 33 extending outwardly along the inner sides of the flanges 30, 30 of the pedal tread. The clamping plates 29, webs 31 of the pedal treads 27 and pedal supports 19 may be transversely drilled in aligned relation with respect to each other to receive rivets 35 or other suitable securing means, clamping the clamping plates to the tread supports 19, and thereby clamping the pedal treads to said tread supports.

Each clamping plate 29 is shown as having an open central portion 36 for retaining an emblem 37 to the pedal. The emblem may be a reflector of a jeweled type, to serve as a warning when riding in the darkness.

The open portion 36 is shown in FIGURE 2 as being diamond shaped and as being dished outwardly from the inside thereof to a raised inwardly extending flange 39, forming the margin of the opening.

The emblem 37 may conform to the opening 36 and is shown as having a base 40 having an outwardly facing shoulder 41 defining the outer margin of said base and conforming to and engaging and extending outwardly along the inner margin of the flange 39, to position the emblem or reflector to extend partially along the clamping plate 29 and to be clearly visible and accessible to light sources to reflect the rays of the light sources.

It may be seen from the foregoing that a simplified form of bicycle pedal construction has been provided, having a novel form of pedal tread and support therefor in which the pedal tread is clamped in position to its support by a clamping plate extending along the outside thereof.

It may further be seen that the clamping plate for the pedal tread serves to retain an emblem to the pedal, which may be in the form of a jeweled reflector and provides a simplified form of retainer therefor, positioning the emblem to be readily viewed and to not only give a decorative effect to the pedal, but also to reflect light rays projected thereon, and to thereby act as a safety reflector when travelling in the dark.

While we have herein shown and described one form in which the invention may be embodied, it may readily be understood that various variations and modifications in the invention may be attained without departing from the spirit and scope of the novel concepts thereof.

We claim as our invention:

1. In a bicycle pedal construction,
   a pair of pedal treads generally I-shaped in cross section, each having spaced flanges having outer tread surfaces and a web connecting said flanges together,
   a pedal shaft,
   a hub rotatably mounted on said pedal shaft, a first cross bar extending from opposite sides of said pedal shaft and abutting one end of said hub,
   a second cross bar abutting the opposite end of said hub and extending to opposite sides thereof, tread supports extending from said second cross bar for securement to said first cross bar, clamping plates of the height of the webs of said pedal treads and slightly longer than said pedal treads for clamping said pedal treads to said pedal supports,
   each clamping plate having an emblem carrying opening therein having outwardly raised inwardly extending flanges forming an outwardly dished receptacle, and an emblem recessed within said receptacle and extending through said opening,
   and means securing said clamping plate to said tread support plates.

2. A bicycle pedal construction in accordance with claim 1 wherein the emblems are jeweled reflectors.

3. A bicycle pedal construction in accordance with claim 1 wherein the emblems have outwardly facing shouldered portions abutting the insides of said outwardly raised inwardly extending flanges defining the emblem carrying openings of said clamping plates, and have reflective jewels mounted therein and visible from the outsides of said clamping plates.

References Cited by the Examiner

UNITED STATES PATENTS 3,127,789 4/1964 Van de Loo _____ 74—594.4

FOREIGN PATENTS 100,637 1/1941 Sweden.

FRED C. MATTERN, JR., *Primary Examiner.*

W. S. RATLIFF, *Assistant Examiner.*